United States Patent [19]

Truscott

[11] 3,978,427
[45] Aug. 31, 1976

[54] ERBIUM LASER DEVICE HAVING NON-MASKING LASER ROD HOLDERS

[75] Inventor: Norman R. Truscott, Whitinsville, Mass.

[73] Assignee: American Optical Corporation, Southbridge, Mass.

[22] Filed: May 23, 1975

[21] Appl. No.: 580,509

Related U.S. Application Data

[63] Continuation of Ser. No. 370,249, June 15, 1973, abandoned.

[52] U.S. Cl. ............................ 331/94.5 P; 330/4.3; 331/94.5 D; 331/94.5 T
[51] Int. Cl.² ...................... H01S 3/093; H01S 3/02
[58] Field of Search ..................... 331/94.5; 330/4.3

[56] References Cited
UNITED STATES PATENTS

| | | | |
|---|---|---|---|
| 3,339,150 | 8/1967 | Bowness | 331/94.5 P |
| 3,617,926 | 11/1971 | Bullinger | 331/94.5 G |
| 3,619,811 | 11/1971 | Kaiser et al. | 331/94.5 D |

*Primary Examiner*—Robert J. Webster
*Attorney, Agent, or Firm*—Howard R. Berkenstock, Jr.; William C. Nealon

[57] ABSTRACT

The members which are utilized to hold and position a rod of erbium laser glass material within an imaging cavity are formed of a glass material which is transparent at the pumping wavelengths of the erbium ions and/or associated sensitizer ions in order to prevent masking of the laser rod to the pumping light energy at those locations where the holders come into contact with the laser rod. This arrangement optimizes the performance of the erbium glass laser rod configuration.

7 Claims, 2 Drawing Figures

ERBIUM LASER DEVICE HAVING NON-MASKING LASER ROD HOLDERS

This is a continuation of application Ser. No. 370,249 filed June 15, 1973, now abandoned.

CROSS-REFERENCES TO RELATED APPLICATIONS

None.

BACKGROUND OF THE INVENTION

This invention is related to laser devices and is more particularly concerned with a new and improved construction whereby erbium laser rods are held within an imaging cavity in a manner such that masking of the rod does not occur.

Trivalent erbium ions when disposed in a glassy host material characteristically emit laser energy at a wavelength of approximately 1.54 nanometers. One distinct advantage which inures to the operation of an erbium doped laser device is that the human eye is quite absorbent to energy at this wavelength; therefore, natural protection against burning of the retina is inherent in the use of this device. The danger of retinal burn is less severe than with nearly all other known laser materials.

In spite of the foregoing important advantage, several disadvantages have been associated with laser devices utilizing erbium as the active laser ion therein. One of these disadvantages is that the erbium laser ion operates as a so-called "three level system". By this one means that the radiative transition from the high energy metastable level is directly to the ground state for the erbium laser ion. In a so-called "four level system", such as neodymium, the radiative transition occurs between the metastable state and another energy level which is above the ground state for that ion. Thereafter, a non-radiative transition occurs during which the laser ion returns to the ground level. As a result, the erbium laser active ions in the material when in the ground state are absorbent to laser energy at the emission wavelength of the laser. Therefore, unless one excites the trivalent erbium ions in the laser rod out of the ground state, a lossy condition exists within the laser rod. This prevents the laser from being operated at reasonable efficiencies.

This problem is particularly acute at those locations along the laser rod at which the laser rod is held by some member to position it within the surrounding imaging cavity. At these locations, the laser rod is masked from the pumping light energy. The erbium active laser ions under the holding members do not see the pumping light energy and are, therefore, allowed to remain in the ground state. When the energy emitted by the excited ions attempts to propagate through the masked areas of the laser rod, the unexcited ions under the holding members absorb some or all of this energy thereby at least greatly reducing the gain attributable to the laser rod.

SUMMARY OF THE INVENTION

Accordingly, it is an object of the present invention to provide a means for positioning and holding a laser rod doped with erbium active ions within an imaging cavity which does not mask portions of the laser rod from the pumping light energy.

Another object of the invention is to provide such holding means which are simple in construction and which allow a rugged and compact arrangement to be formed.

Briefly, the invention in its broadest aspect is embodied in a laser device of the type wherein an elongated laser rod and associated optical pumping means are disposed in an imaging cavity and the laser rod is formed of a glass host material into which have been doped laser active trivalent erbium ions. The improvement in this device comprises a plurality of holding members disposed in contact with the elongated laser rod at regular circumferential intervals at at least two separate positions along the length of the rod. The holding members are formed of a glassy material which is transparent at the laser pumping wavelengths. Means are provided for cooperatively urging the holding members against the elongated laser rod so as to align the rod within the surrounding imaging cavity. Further non-absorbent means are interposed between the holding members and the laser rod to hold the laser rod firmly in position.

Further objects, advantages, and features of the invention will be apparent in the arrangement and construction of the constituent parts, in detail, as set forth in the following specification taken together with the accompanying drawing.

DETAILED DESCRIPTION OF THE PREFERRED EMBODIMENTS

Figure 1:
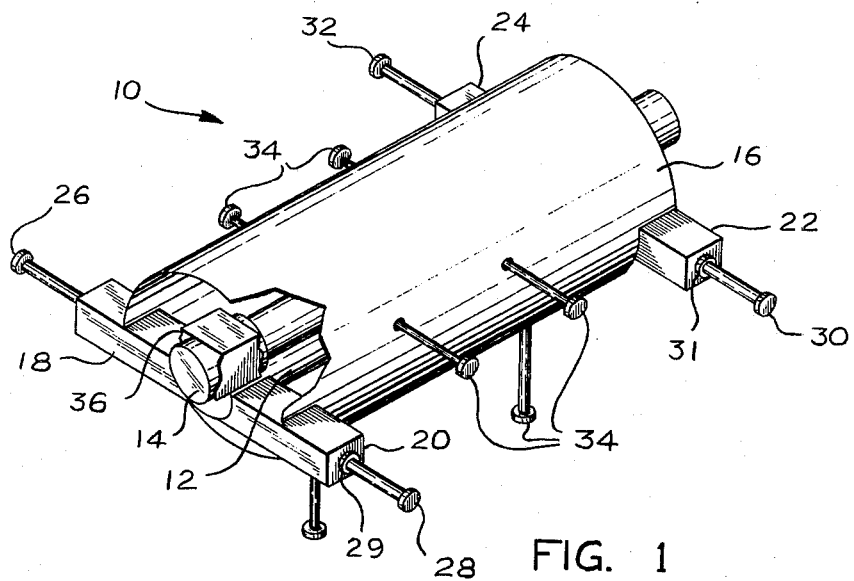
FIG. 1 is a schematic isometric view of a portion of a laser device according to the invention which is partially cut away to show various features thereof.
Figure 2:
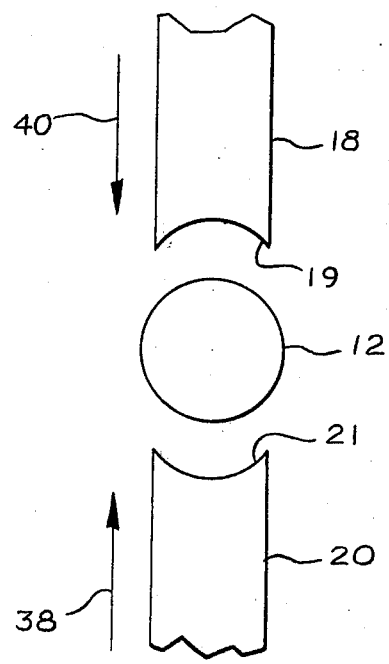
FIG. 2 is an enlarged end view of the holding arrangement shown in FIG. 1.

In referring to the following figures of the drawing, like reference numerals will be utilized to refer to identical parts.

Referring initially to FIG. 1 of the drawing, there is shown a laser device 10 according to the invention. The laser device 10 is comprised generally of a laser rod 12, an associated flashlamp 14, and a surrounding imaging cylinder 16. The laser rod 12 and the flashlamp 14 are positioned with their respective axes parallel to each other and to the axis of the imaging cylinder 16. Furthermore, the laser rod 12 and flashlamp 14 are positioned within the imaging cylinder 16 in a manner such that the pumping light energy radiated by the flashlamp 14 is imaged by a reflective coating on the interior surfaces of the imaging cylinder 16 onto the laser rod 12. This pumping light energy serves to excite the active erbium laser ions in the laser rod from a ground state to some upper level metastable state from which the radiative transition of the laser ions can occur. This may occur directly, but preferably occurs through a transfer of energy through trivalent ytterbium sensitizer ions within the laser rod.

In the embodiment of the present invention shown in FIG. 1, the laser rod 12 is positioned in the imaging cavity 16 by means of holding members 18, 20, 22, and 24. The holders are divided into two pairs 18 and 20, and 22 and 24, which are identical in arrangement and function. The members 18 and 20 are formed of a glass material which is highly transparent at those wavelengths at which the erbium and/or ytterbium sensitizer ions are absorbent. The holding members may be formed of a clear glass or they may be formed of the same erbium doped glassy material from which the laser rod 12 is formed. The holding members 18 and 20 are formed such as rectangular members shown in the Figures or cylindrical bars of the glassy material and have ground, concave end surfaces 19 and 21 respectively which mate precisely with the similarly ground outer surface of the laser rod 12. The surfaces are ground so that sufficient frictional force may be developed between the holding members and the laser rod to provide both lateral and axial stability while assuring that the pumping light energy can pass therethrough with minimal losses. The members 18 and 20 are aligned along a common axis perpendicular to the laser rod axis. Obviously, a greater number of holding members could be utilized at each location along the laser rod as well as the number of locations could be increased within the purview of the invention depending on the size of the laser rod and the environment in which the device is to be utilized.

As was stated above, erbium is a three level laser ion and is absorbant at the laser emission wavelength when in the ground state. When the holders are formed of the same glass material as the laser rod as may be the case in the present invention, the pumping light energy from the flashlamp 14 excites the erbium ions in the holders either directly or through sensitizer ions, into the metastable condition in a manner identical to that of the ions in the laser rod per se. The holders then become transparent at the emission and pumping wavelengths of the laser. In this manner, the pumping light energy passes through the holding members into the portions of the laser rod under the holding members so that the ions thereunder are also pumped into an excited state to enable the laser rod to operate at a higher efficiency.

In order that the laser rod 12 is positioned firmly within the imaging cavity 16, means are necessary to urge the holding members against the laser rod. In the embodiment shown in FIG. 1, this function is provided by a series of laser rod holder thumbscrews 26, 28, 30 and 32 associated with holding members 18 through 24 respectively. The outer mounting structure of the laser assembly through which the thumbscrews are threaded is not shown in FIG. 1 for clarity. When the laser device is operated, certain quantities of heat are absorbed by the laser rod and the holding members. In order to prevent catastrophic failures due to thermal stresses, it is necessary that some resilient means be used to absorb the physical expansion in the glass elements. This is provided in the embodiment of FIG. 1 by pads 29 and 31 which are positioned under thumbscrews 28 and 30 respectively. Similar pads are also associated with thumbscrews 26 and 32. The pads are preferably formed of nylon.

Furthermore, a series of image cylinder adjusting thumbscrews 34 is provided for aligning and positioning the imaging cylinder 16 with respect to the flashlamp 14 and the laser rod 12 such that maximum pumping energy is imaged on the laser rod. The flashlamp 14 is held within the imaging cavity by a pair of flashlamp connector and holder members 36.

In the preferred embodiment of the invention, the laser rod 12 is formed of an inorganic glass material doped with trivalent erbium active ions and ytterbium sensitizer ions. An example of a glass which may be utilized for this purpose is given in weight percent in the following table:

| | |
|---|---|
| $SiO_2$ | 59.83 |
| $LiO_2$ | 0.89 |
| $Na_2O$ | 6.42 |
| $K_2O$ | 9.71 |
| $BaO$ | 4.28 |
| $ZnO$ | 1.34 |
| $Al_2O_3$ | 1.34 |
| $Sb_2O_3$ | 0.89 |
| $Er_2O_3$ | 0.30 |
| $Yb_2O_3$ | 15.00 |

In some applications, for reasons which do not involve the present invention, it may be desirable to utilize a cladding on the glass laser rod. A composition for this cladding material which has been found to be compatible with the foregoing laser glass is given below in weight percent:

| | |
|---|---|
| $SiO_2$ | 60.7 |
| $LiO_2$ | 0.9 |
| $Na_2O$ | 6.5 |
| $K_2O$ | 9.9 |
| $BaO$ | 4.3 |
| $ZnO$ | 1.4 |
| $Al_2O_3$ | 1.4 |
| $Nd_2O_3$ | 4.0 |
| $Yb_2O_3$ | 4.0 |
| $Y_2O_3$ | 5.0 |
| $CeO$ | 1.9 |

While there have been shown and described what is considered to be a preferred embodiment of the present invention, it will be obvious to those skilled in the are that various changes and modifications art be made therein without departing from the invention as defined in the appended claims.

I claim:
1. In a laser device of the type wherein an elongated laser rod and associated optical pumping means are disposed in an imaging cavity, the laser rod being formed of a glass host material into which have been doped laser active trivalent erbium ions, the improvement in which comprises:
   a plurality of non-absorbent holding members being disposed in contact with the elongated laser rod circumferentially around said rod at regular intervals at each of at least two separate positions along the elongated laser rod firmly holding the rod in position, the holding members being formed of a glassy material which is transparent to pumping light energy from the optical pumping means at those wavelengths at which pumping energy is absorbed by the laser rod and being of such dimension so as to transmit said pumping light energy to the portions of the rod which they contact;
   means for cooperatively urging the holding members against the elongated laser rod to align and hold the laser rod within the imaging cavity; and
   resilient means interposed between said holding members and said means for aligning said laser rod within the imaging cavity.

2. The laser device according to claim 1, wherein each of the holding members has a ground surface thereon which fits snugly against a like ground surface on the elongated laser rod whereby the laser rod is held in position axially and laterally by said holding members.

3. The laser device according to claim 2, wherein the holding members are formed from cylinders of the same erbium doped laser glass from which the laser rod is formed.

4. The laser device according to claim 2, wherein said resilient means are associated with each of the holding members and are adapted to absorb physical expansion forces within the glass members.

5. The laser device according to claim 4, including two holding members disposed in contact with the elongated laser rod at each of two positions, each of which is adjacent to a respective end of the elongated laser rod.

6. The laser device according to claim 5, wherein said means for cooperatively urging is a thumbscrew associated with each holding member.

7. The laser device according to claim 6, wherein the resilient means is a nylon pad positioned under each thumbscrew.

* * * * *